Nov. 27, 1956 G. J. ZEABARI 2,772,041
AUTOMOBILE TRUNK EXTENSION
Filed Sept. 23, 1954 3 Sheets-Sheet 1

INVENTOR.
George J. Zeabari
BY
Stanley Lightfoot
Attorney

Nov. 27, 1956 G. J. ZEABARI 2,772,041
AUTOMOBILE TRUNK EXTENSION
Filed Sept. 23, 1954 3 Sheets-Sheet 2
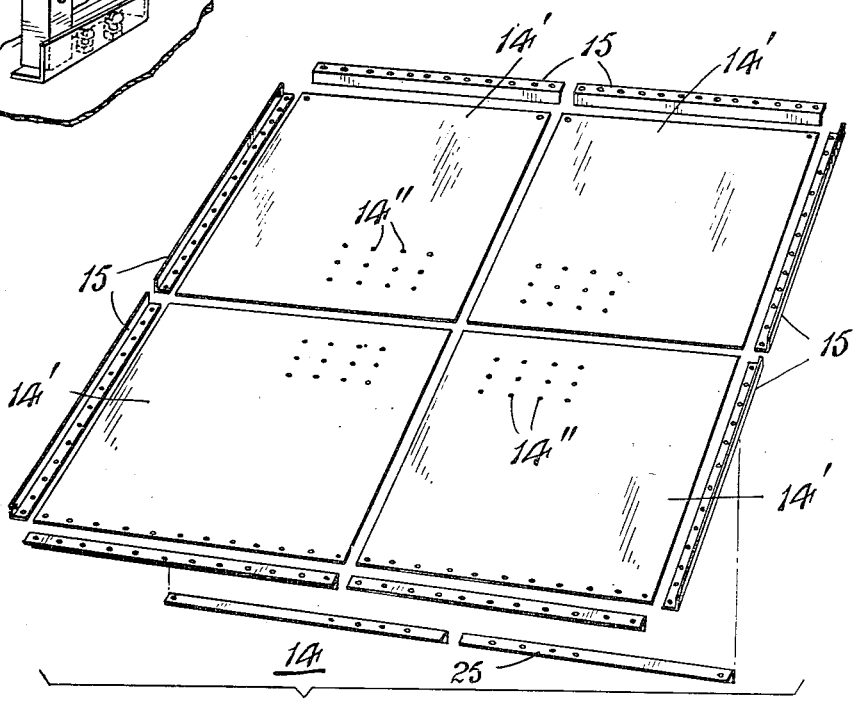
INVENTOR.
George J. Zeabari.
BY
Stanley Lightfoot
Attorney.

Nov. 27, 1956 G. J. ZEABARI 2,772,041
AUTOMOBILE TRUNK EXTENSION
Filed Sept. 23, 1954 3 Sheets-Sheet 3

INVENTOR.
George J. Zeabari
BY
Stanley Lightfoot
Attorney

United States Patent Office 2,772,041
Patented Nov. 27, 1956

2,772,041

AUTOMOBILE TRUNK EXTENSION

George J. Zeabari, Detroit, Mich.

Application September 23, 1954, Serial No. 457,929

10 Claims. (Cl. 224—42.44)

This invention relates to means, more particularly intended as an attachable accessory, for amplifying the usefulness of an automobile trunk luggage compartment by providing therein a platform (which may serve to conceal a spare tire carried in or on the regular floor of the trunk), said platform being adapted to be swung outwardly of the trunk to a rearwardly extended position and being also provided with means whereby such platform may be effectively braced in its extended position from brackets provided for that purpose on the rear portion of the vehicle chassis or on parts associated with the rear portion of the chassis such as the usual bumper supports.

Provision is made, where desirable, for dimensional adjustment of the platform and its supporting elements whereby the device may be adjusted to meet the requirements of various trunk or vehicle designs, and whereby it may be correspondingly attached, as an accessory, to a number of different makes and types of vehicles having rear-end trunk luggage compartments.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 3 is a detail transverse sectional view taken on a plane indicated by the line 3—3 in Figure 1;

Figure 4 is a fragmentary sectional detail perspective view of one of the adjustable supports of the device within the car trunk;

Figure 5 is an exploded perspective view of parts forming the platform of the said device;

Similar characters of reference indicate similar parts of the several figures of the drawing.

The device comprises an auxiliary platform adapted to be carried within the trunk of a vehicle (such as by resting over the frame of the well which is frequently provided in such trunks to accommodate a spare tire); this platform being hingedly mounted within the trunk upon suitable supports whereby it may be swung outwardly of the trunk into a horizontally extended position, and being further provided with braces extending from the free end of said platform to be attached to suitable bracket means mounted on the bumper supports (or adjacent members) of the vehicle chassis. Provision is made for adjustment of these braces, and of the platform and its supporting members, in order to adapt the device to application to vehicles of differing dimensions and design.

The trunk portion A of vehicle is shown, 10 being the vehicle frame and 11 being the usual bumper supports extending rearwardly of the said frame to carry the bumper 12. 13 indicates a spare tire accommodated within and upon the floor of the trunk A, this tire being sometimes accommodated within a suitable recess or compartment provided therefor.

14 indicates generally a platform which may be of any suitable size for the particular purpose but which I prefer to construct of four overlapping plates 14', admitting of their relative adjustment as to overlapping to vary the overall dimensions of the said platform to suit the size and shape of the trunk in which it is to be used, as will be obvious.

The outermost edges of these plates 14' are shown as being provided with angle iron marginal members 15 which may also adjustably overlap each other at their opposed ends, in accordance with the overlapping of the plates 14', and which are provided with a series of perforations which may be matched in accordance with such adjustment to permit the bolting together of the members in positions of adjustment.

The plates 14' are also shown as provided with a plurality of perforations 14" suitably positioned for matching and bolting, to secure the said plates in adjusted overlapped position centrally of the general area of said platform.

Side boards 16 are also shown as being constructed of overlapping elongated plates to conform with the overlapping adjustment of the plates 14'. These side boards are hinged, as in 17, so that they may be collapsed or folded down upon the surface of the platform when their use is not required.

Figure 1:
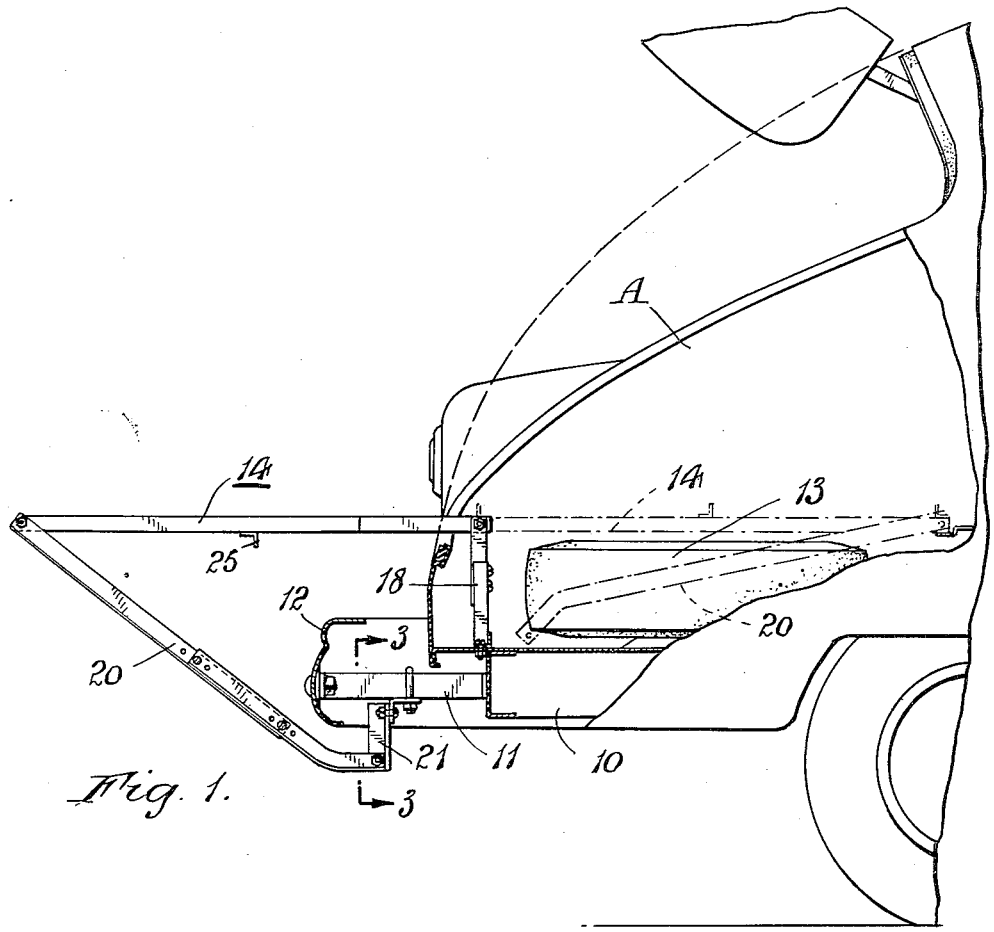
Figure 1 is a side elevation of the rear end of an automobile body, shown partly broken away and in section, with my improved arrangement of trunk platform or floor extension applied thereto, and shown in open or extended position in full lines and in closed position in broken lines.
Figure 2:
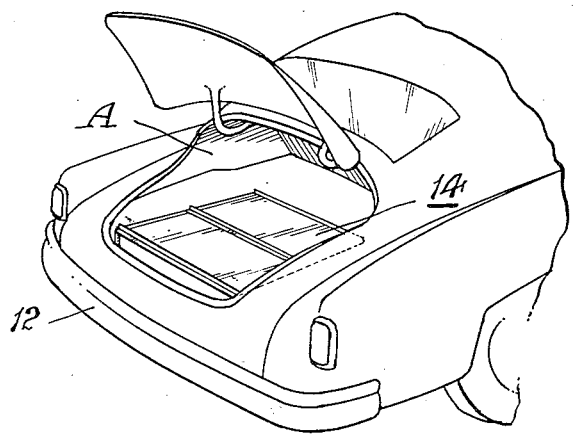
Figure 2 is a perspective view of the same showing the said platform in its folded or closed position within the car trunk.
Figure 6:
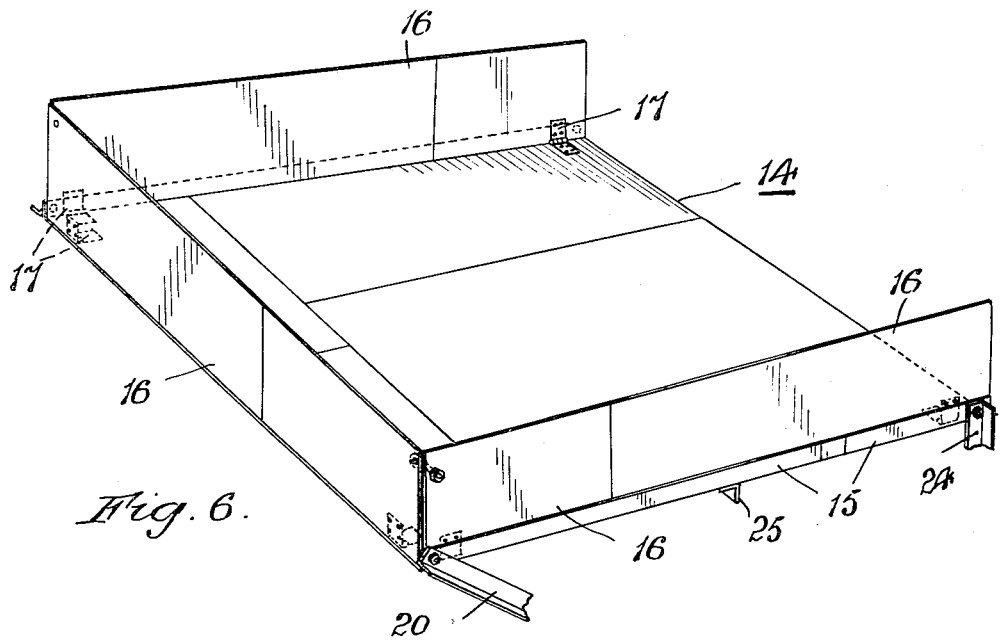
Figure 6 is a perspective view of such platform illustrating the application of side boards thereto.
Figure 7:
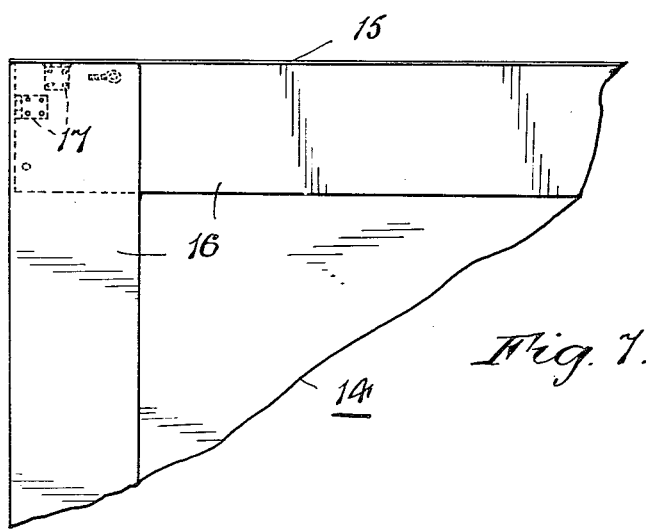
Figure 7 is a fragmentary detail view, in plan, of one of the corners of the said platform with the side boards folded downwardly thereover.

The corners of the said platform adjacent the rear open end of the trunk are hingedly supported above the frame on vertically adjustable posts 18, so that the said platform may be swung inwardly of the trunk to extend over the floor thereof (and over the spare tire 13 where this is accommodated in or on the floor of the trunk) as illustrated in broken lines in Figure 1; or the platform may be swung outwardly of the trunk to a horizontal position, as indicated in full lines in the said Figure 1, to thereby increase the carrying capacity of the trunk.

To support the said platform in this open or extended position, I provide a pair of braces 20 which are adjustable in length and are hingedly connected each at one end to the outer free end of the said platform, the other ends of the said braces being adapted to be secured (as by means of bolts) to brackets 21 carried by a cross-bar 22 which is shown as being secured, by U-bolts 23, to the underside of the vehicle bumper supports 11. As in the case of previously described elements of this device, the cross-bar 22 may also be adjustable as to length to suit various designs of vehicle to which it may be applied.

It will be obvious that the position of the platform above the floor of the trunk may be arranged as to height to meet any specific requirement, such as may be dictated by whether or not a tire or other obstruction extending above the floor is to be avoided, and that the free end of the platform may be supported in its closed position above the floor of the car as by struts 24 which may be adjustable as to height if so desired.

I have also shown, on the drawing, a reinforcing crossbar 25 of an adjustable nature extending beneath the platform as viewed in its "open" position; and this crossbar may be perforated to facilitate its being engaged by bolts which as may be passed through some of the perforaitons 14" of the platform plates 14'.

The device described not only increases the carrying capacity of a trunk when the platform is extended and enables it to accommodate articles of a length which might not otherwise be conveniently carried thereby, but also, when the platform is in its "closed" position, provides an auxiliary floor above any tire or other obstruction extending above the floor of the car trunk, thus assisting in the orderly storage of baggage or articles within the trunk.

This invention may be developed within the scope of the following claims without departing from the essential features of the said invention, and it is desired that the specification and drawing be read as being merely illustrative of a practical embodiment of the same and not in strictly limiting sense.

What I claim is:

1. An automobile trunk platform comprising a substantially flat floor having two opposing ends, widely spaced support posts adapted to be connected within the rear end of an automobile trunk, said platform normally occupying a position in the automobile trunk with one of said floor ends being positioned between and permanently hinged to said support posts, means for adjusting the hinged connection between the said floor end and the said support posts, the other of said floor ends being adapted to be swung rearwardly beyond the backmost portion of said automobile, and strut means connecting said other floor end to said automobile frame and holding said floor in a substantially horizontal position.

2. An automobile trunk platform comprising a substantially flat floor having two opposing ends, widely spaced support posts adapted to be connected within the rear of an automobile trunk and extending above the level of the trunk floor, one of said opposing ends being disposed between said posts and permanently pivotally attached to said posts, means for adjusting the pivotal attachment between the said floor end and the support posts, the other of said ends extending beyond the rearmost portion of said automobile, and struts connecting said other end to the automobile frame, said struts being disconnectable whereby said floor may be pivoted about said posts into the trunk of said automobile.

3. An automobile trunk platform for use with the rear luggage trunk of an automobile, comprising a substantially flat floor of narrower width than the width of said trunk when open, said floor being permanently pivotally connected within said trunk and adapted to be swung out of said trunk beyond the rearmost portion of said automobile, means for adjusting the pivotal connection of the floor within the trunk, support means connecting the outer portion of said floor to said automobile and arranged to hold said floor in a substantially horizontal position, said support means being detachable whereby said floor may be pivoted into said automobile trunk.

4. An automobile trunk platform for use with the luggage trunk of an automobile, comprising a substantially flat floor of narrower width than the width of said trunk when open, adjustable height posts secured within said automobile trunk, said floor being permanently pivotally connected to said posts and adapted to be swung out of said trunk beyond the rearmost portion of said automobile, support struts connecting the outer portion of said floor to said automobile and arranged to hold said floor in a substantially horizontal position, said support struts being detachable whereby said floor may be pivoted into said automobile trunk, and support brackets arranged within said trunk and adapted to hold said floor in substantially horizontal position within said trunk when said floor is pivoted therein.

5. An automobile trunk platform for use with the luglage trunk of an automobile, comprising a substantially flat floor of narrower width than the width of said trunk when open, widely spaced posts secured within said automobile trunk, said floor being positioned between and permanently pivotally connected to said posts and adapted to be swung out of said trunk beyond the rearmost portion of said automobile, means for adjusting the pivotal connection between the floor and the posts, brackets secured to the automobile bumper supports, struts interconnecting the outer portion of said floor with said brackets and being detachable from said brackets, said struts holding said floor in a substantially horizontal position.

6. The device as set forth in claim 1, wherein said strut means are also adjustable.

7. The device as set forth in claim 2, wherein said struts are also adjustable.

8. The devices as set forth in claim 3, wherein said support means are adjustable.

9. The device as set forth in claim 4, wherein said support struts are also adjustable.

10. The device as set forth in claim 5, wherein said struts are also adjustable.

References Cited in the file of this patent

UNITED STATES PATENTS

| 1,947,745 | Taylor | Feb. 20, 1934 |
|---|---|---|
| 2,246,813 | Preston | June 24, 1941 |
| 2,568,628 | Herring | Sept. 18, 1951 |
| 2,593,908 | Monteverde | Apr. 22, 1952 |
| 2,626,179 | Gonzalez | Jan. 20, 1953 |

FOREIGN PATENTS

| 95,929 | Sweden | June 6, 1939 |